(No Model.)
R. C. TOMPKINS.
HOG SCRAPING MACHINE.
No. 255,398. Patented Mar. 21, 1882.
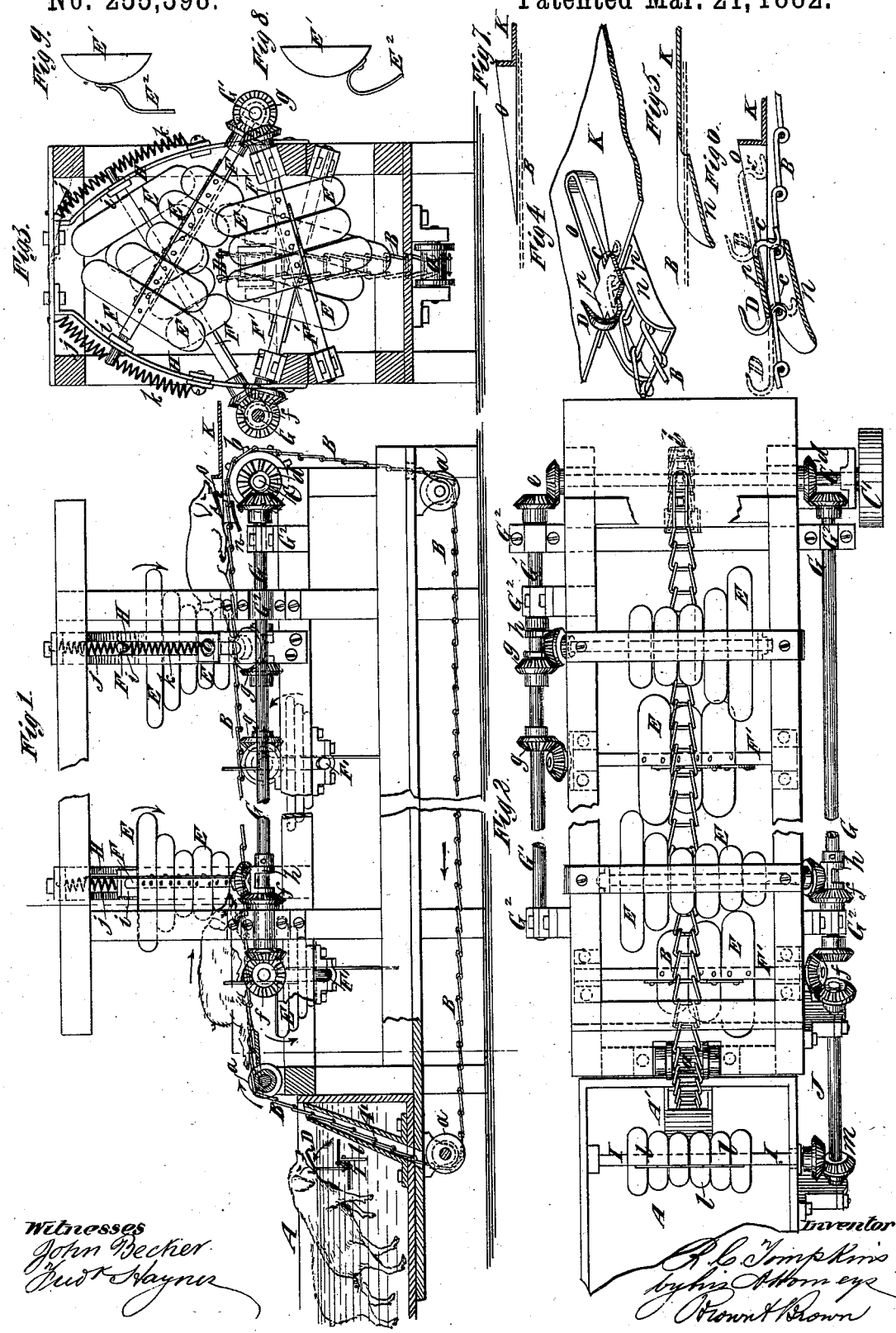

ns.

UNITED STATES PATENT OFFICE.

RHINELANDER C. TOMPKINS, OF NEW YORK, ASSIGNOR OF ONE-HALF TO AMASA SPRING, OF WHITE PLAINS, N. Y.

HOG-SCRAPING MACHINE.

SPECIFICATION forming part of Letters Patent No. 255,393, dated March 21, 1882.

Application filed April 14, 1880. (No model.)

*To all whom it may concern:*

Be it known that I, RHINELANDER C. TOMPKINS, of the city of New York, in the county and State of New York, have invented certain new and useful Improvements in Hog-Scraping Machines, of which the following is a specification.

One feature of my invention consists in the combination, in a hog-scraping machine, of scraping devices, an endless chain or carrier for drawing the carcasses through, over, or in contact with said scraping devices, a scalding-tub arranged in proximity to an ascending portion of said chain or carrier, and means for attaching the carcasses to said portion of said chain or carrier while in the tub, whereby they may be taken directly from the tub, drawn upward therefrom, and carried to the scraping devices.

Another feature consists in the combination with such tub or vessel and chain or carrier, of a rotary or other scraping device arranged in such relation to the tub or vessel and chain or carrier that as the carcass is drawn from said tub or vessel its under side, or the portion which will rest upon the chain or carrier, is scraped.

Another feature consists in the combination, in a hog-scraping machine, with a rotary shaft or shafts, of a series of scrapers or scraping devices made of elastic material or having an elastic connection with said shaft or shafts, and having salient rounded edges or faces.

The carcasses are attached to the chain or carrier by means of detachable hooks; and another feature of my invention consists in means whereby the said hooks are automatically detached from said chain or carrier at the proper time.

Other features consist in various details of construction and combinations of parts whereby the desired ends are attained.

In the accompanying drawings, Figure 1 represents a side view and partial longitudinal section through a scraping-machine embodying my invention, the central portion thereof being broken away. Fig. 2 represents a plan thereof. Fig. 3 represents a transverse vertical section thereof. Figs. 4, 5, 6, and 7 represent detail views, showing the construction and operation of the devices employed for automatically detaching the hook by which the carcass is connected to the chain or carrier from said chain or carrier; and Figs. 8 and 9 represent detail views, illustrating scrapers or scraping devices of modified form.

Similar letters of reference designate corresponding parts in all the figures.

A designates the tub or vessel in which the hogs are scalded preparatory to being scraped, and B designates an endless chain or carrier by which the carcasses are drawn from the tub or vessel and carried between or past the scrapers or scraping devices. This chain or carrier passes around wheels or drums a, and motion is imparted to it by a sprocket or toothed wheel, b, upon a shaft, C, which may constitute the driving-shaft of the apparatus, and is furnished with a driving pulley, C'. As here represented, an ascending portion of the chain or carrier B passes up through a trunk or tube, A', projecting upward from the bottom of the tub or vessel A; but it might, if desirable, be made to pass upward outside the tub or vessel, which would in that case have an inclined or slanting end. The carcass after being scalded is attached by means of a hook, D, to the chain or carrier, and, motion being imparted to the latter, the carcass is drawn up out of the tub or vessel and carried forward between, over, or past the scrapers or scraping devices.

The form of the hook D is clearly represented in Figs. 4 and 6, and comprises a downwardly-projecting prong or arm, c, which is shaped so as to engage with the cross-bars of the links of the chain or carrier, as most clearly shown in dotted outline in Fig. 6.

The scrapers or scraping devices E are here represented as fixed upon shafts arranged transversely to the direction of the movement of the chain or carrier B. As here represented, two of these transverse shafts, F, are shown as arranged above the chain or carrier, and two other shafts, F', are shown as arranged below the said chain or carrier; but any greater number of shafts and series of scrapers or scraping devices may be employed. As represented clearly in Fig. 3, the shafts F are preferably arranged so that they slope or incline upwardly from each side of the machine or apparatus, while the shafts F' are arranged so that they slope downwardly from each side thereof, thus affording a space between them for the passage of the chain or carrier and the attached carcass or carcasses. Motion is in this instance transmitted to the shafts F F' by means of longitudinal shafts G G', supported in bearings G², connected to the driving-shaft C by bevel-gears $d$ $e$, and connected with the shafts F F' by means of bevel-gears $f$ $g$.

In order to adapt the machine for scraping carcasses of different sizes, the shafts F are supported in bearings so constructed as to permit of the automatic adjustment of the said shafts at different angles. As here represented, the lower or inner ends of such shafts are supported in bearings $h$, which are swiveled or pivoted upon the shafts G G', so as to permit the shafts F to swing freely in a radial direction. The outer or upper ends of said shafts are supported in bearings $i$, which are constructed to slide in arc-shaped ways H upon each side of the machine. As the carcass is drawn through the machine the shafts F gravitate downward by their weight, so as to cause the scrapers or scraping devices E to operate effectively upon the carcass; but when a carcass of large size is drawn through the machine the shafts F are automatically raised or swung radially upward or outward, to prevent injury to the scrapers or apparatus. The shafts F might be weighted to increase the pressure of the scrapers or scraping devices upon the carcass; but, as here represented, spiral springs $j$ $k$ are arranged upon each side of the sliding bearing-blocks $i$, and so connected thereto that they impart a downward pressure to said shafts, the one set of springs, $j$, by their extension and the other, $k$, by their contraction.

Scrapers or scraping devices of any suitable or desired construction may be attached to the several shafts, F F'; but those which I prefer to employ and have here represented are composed of elastic material or have an elastic connection with the shafts F F', upon which they are fixed, and have salient curved ends or acting edges, so as to more readily operate upon the various parts of the carcass. These scrapers or scraping devices may be secured to their shafts in any way. In this instance the shafts are represented as square and the scrapers or scraping devices as composed of thin sheet metal, which possesses sufficient elasticity. These scrapers or scraping devices are secured upon the four sides of the shafts so that the scrapers upon two opposite sides of the shaft come opposite the spaces between the scrapers upon the other sides thereof, and the scrapers are shown as placed close together upon said shafts.

In lieu of the sheet-metal scrapers E, I may employ concave cup-shaped scrapers E', of the form shown in Figs. 8 and 9, and in this case the required elasticity would be afforded by the arms E², which connect the scrapers to their shafts or supports in either of the ways shown in Figs. 8 and 9.

It will be observed that as the carcass is drawn forward past the rotary scrapers the latter, owing to their elasticity and salient curved faces, together with the automatic movement of their shafts, enable the scrapers to act effectively upon the irregular surfaces of the carcass, and that the latter will be operated on at all points, save at the under side or portion, which rests upon the chain or carrier. In order to scrape the said under side before the carcass is taken upon the chain, I employ a scraping device in the tub or vessel A, over which the carcass is drawn by the chain or carrier. This may consist of a stationary device, or, as here represented, of a rotary scraper, I, (clearly represented in Figs. 1 and 2,) and likewise comprising elastic blades or scrapers $l$, having salient rounded ends. Motion is in this instance communicated to said scraping device by a shaft, J, and bevel-gears $m$. (Clearly shown in Fig. 2.) After the carcasses have been drawn by the chain or carrier past the scrapers or scraping devices it is desirable that means be employed for automatically disengaging the hooks D from the chain or carrier. The means here employed consist of an incline, $n$, arranged beneath a delivery-table, K, under which the chain or carrier passes, and in proximity to the chain or carrier, so that as the latter moves past it the prong or arm $c$ upon the hook D, bearing upon said incline, raises the hook into the position shown in full outline in Fig. 6, disengaging the said prong from the links of the chain or carrier.

The form of delivery-table K shown in Fig. 5 has only the incline $n$; but to insure the complete disengagement of the hooks I preferably provide another incline, $o$, upon the upper surface of said delivery-table, (shown clearly in Fig. 7,) and construct the hooks with side wings or arms, $p$, which ride upon the incline $o$ and prevent the prong $c$ of the hook from re-engaging with the chain or carrier. After the disengagement of the carcasses from the chain or carrier they may be drawn to one side upon the delivery-table K, the hooks D removed, and the dressing of the carcasses proceeded with.

In some cases the shafts F F', with their rotary scraping devices, might be dispensed with, and in such case the devices for detaching the carcasses from the chain would be used in connection with the scalding tub or vessel and the rotary scraping device I, while the delivery-table K would be arranged in close proximity to the tub or vessel and the scraping done by hand.

By my invention I provide a machine or apparatus for scalding and scraping hogs which dispenses in a great measure with manual labor and is capable of performing these operations very quickly and thoroughly.

What I claim as my invention, and desire to secure by Letters Patent, is—

1. The combination, in a hog-scraping machine, of scraping devices, an endless chain or carrier for drawing the carcasses through, over, or in contact with said scraping devices, a scalding-tub arranged in proximity to an ascending portion of said chain or carrier, and means for attaching the carcasses while in the tub to said portion of said chain or carrier, whereby they may be taken directly from the tub, drawn upward therefrom, and carried to the scraping devices, substantially as specified.

2. The combination, with a tub or vessel and a trunk or tube, A', of a series of scraping devices and an endless chain or carrier passing up through said trunk or tube for the purpose of taking the carcasses from the tub or vessel and presenting them to the scraping devices, substantially as specified.

3. The combination, with a scalding tub or vessel and an endless chain or carrier passing through or arranged in close proximity to said tub or vessel, so as to draw the carcass directly therefrom, of a scraper or scraping device, which is arranged within said tub or vessel, and over which the carcass passes as it is drawn from said tub or vessel, substantially as specified.

4. The combination, with a scalding tub or vessel, an endless chain or carrier passing through or arranged in close proximity to said tub or vessel, so as to draw the carcass directly therefrom, and scraping devices past which the carcass is drawn by said chain or carrier after leaving said tub or vessel, of a scraper or scraping device, which is arranged within said tub or vessel, and over which the carcass passes as it is drawn from said tub or vessel, substantially as specified.

5. The combination of the tub or vessel A, the chain or carrier B, and the rotary scraping device I, arranged in said tub or vessel, substantially as specified.

6. In a hog-scraping machine, the combination, with a rotary shaft or shafts, of a series of scrapers or scraping devices, made of elastic material or having an elastic connection with said shaft or shafts, and having salient rounded edges or faces, substantially as specified.

7. The combination, with an endless chain or carrier, of the hooks D, provided with downwardly-projecting prongs or arms c, for engaging with the links of said chain or carrier, substantially as specified.

8. The combination of the endless chain or carrier, the delivery-table, under which the chain or carrier passes, provided with an incline over which the chain or carrier passes, and the hook provided with the prong or arm c, which rides upon said incline and disengages said hook from said chain or carrier, substantially as specified.

9. The combination of the chain or carrier B, the delivery-table K, provided with inclines n and o, and the hook D, provided with the prong or arm c, and side wings or arms, p, all substantially as specified.

R. C. TOMPKINS.

Witnesses:
THOMAS E. BIRCH,
A. C. WEBB.